Jan. 12, 1971 W. O. CHRISTIANSON 3,555,495

BINDING POST

Filed Feb. 12, 1969 2 Sheets-Sheet 1

INVENTOR.
WILLIAM O. CHRISTIANSON

BY

Drummond, Cahill & Phillips

ATTORNEYS

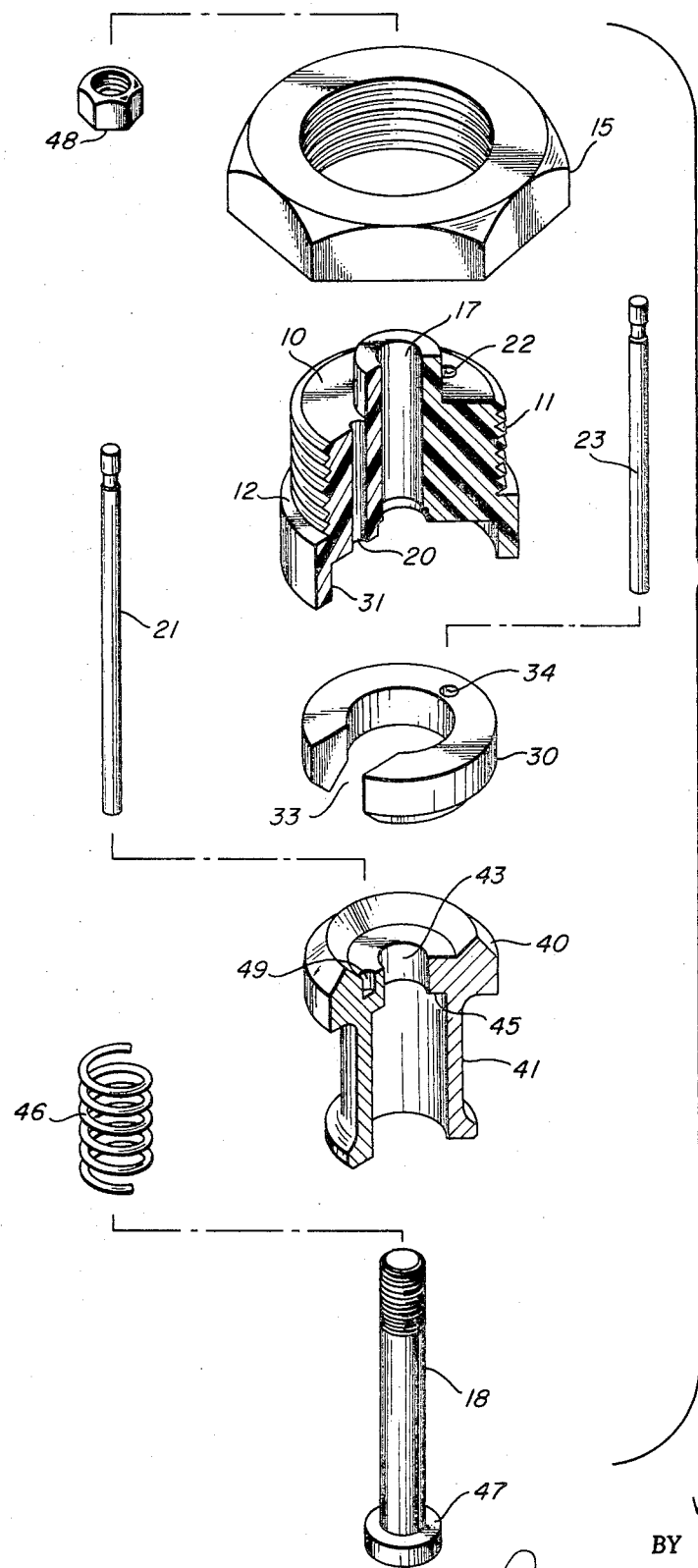

3,555,495
BINDING POST

William O. Christianson, Litchfield Park, Ariz., assignor, by mesne assignments, to Unidynamics/Phoenix, Goodyear, Ariz., a corporation of Delaware
Filed Feb. 12, 1969, Ser. No. 798,685
Int. Cl. H01r 7/28
U.S. Cl. 339—203                                                 5 Claims

ABSTRACT OF THE DISCLOSURE

A pair of electrically conducting rings are spring-urged into contact with each other. A conducting post is connected to each of the rings; each post extends through a rigid body member of insulating material. The conducting posts are thus insulated from each other to insure that electrical connection between external conductors connected thereto, is made only at the conducting rings.

---

The present invention pertains to electrical connectors, and more particularly, to the class of electrical connectors referred to as binding posts.

In electrical measurement techniques, it is frequently necessary to connect two different instruments to the same terminals for the determination of an electrical property of a third device connected between the terminals. An example of such a requirement is evidenced by the precision measurement of the resistance value of a resistor. In the latter case, the resistor is connected to a constant current source to provide current through the resistor while a precision voltage monitor is connected across the resistor to determine the voltage drop thereacross. The resistance existing at the contact between the voltage monitor (high input impedance) is insignificant in comparison with the impedance of the voltage monitor. The error introduced by the contact resistance is normally insignificant under circumstances that require four-digit accuracy on the monitor. If the voltage monitor was required to share the contact to the resistor with the constant current source, the combined contact resistance may be of sufficient significance to require correction. Therefore, to accurately determine the resistance under the test circumstances given above, it is necessary to connect the resistor under test to a two-wire device so that the two wires may be connected, one to the voltage monitor and one to the constant current source. It may also be seen that these two wires, to accomplish their intended function, must be electrically isolated from each other.

Devices presently utilized to accomplish the desired electrical isolation include cumbersome arrangements, such as two-wire alligator clips, two-wire knife clips, etc. These devices do not lend themselves to convenient rapid and repeated usage, such as is frequently required in precision instrumentation environments.

It is therefore an object of the present invention to provide apparatus for electrically connecting two electrical conductors to a third.

It is another object of the present invention to provide apparatus for making electrical connection to an electrical conductor from two other conductors by means of a binding post.

It is still another object of the present invention to provide a binding post wherein a pair of simple electrically conducting rings, spring-biased toward each other, are utilized to connect two otherwise isolated conductors to a third conductor.

These and other objects of the present invention will become apparent to those skilled in the art as the description thereof proceeds.

Briefly, in accordance with the embodiment chosen for illustration, a rigid plastic body member is provided with external threading to permit convenient connection to a supporting surface. The body includes a central opening to receive a spring-supporting bolt. A passageway, parallel to said central opening, is also provided in the body member. A first contact ring is secured to the body and is provided with an opening aligned with the passageway in the plastic body to permit a conducting post to extend through the plastic body and through the opening in the ring. A second contact ring is movably secured to the plastic body and is spring-biased into contact with the first ring by means of a coil spring mounted on the spring-mounting bolt. A pair of conducting posts are connected to the first and second conducting rings, the first post being electrically connected to the first ring and rigidly supported by the plastic body. The second conducting post extends through the passageway in the plastic body, through the opening in the first contact ring and into electrical contact with the second contact ring. Force exerted on the second contact ring against the biasing spring results in sliding movement of the second conducting post relative to the first contact ring and the rigid body member. Electrical contact is thus readily made to the first and second contact rings, while the contacts themselves are electrically insulated from each other. The lead wire of a component under test, such as a resistor, may then conveniently be placed between the contact rings to be gripped thereby through the force exerted by the coil spring.

The present invention may more readily be described by reference to the accompanying drawings, in which:

FIG. 4 is an exploded view, partly in section, of the apparatus of FIG. 1.

Figure 1:
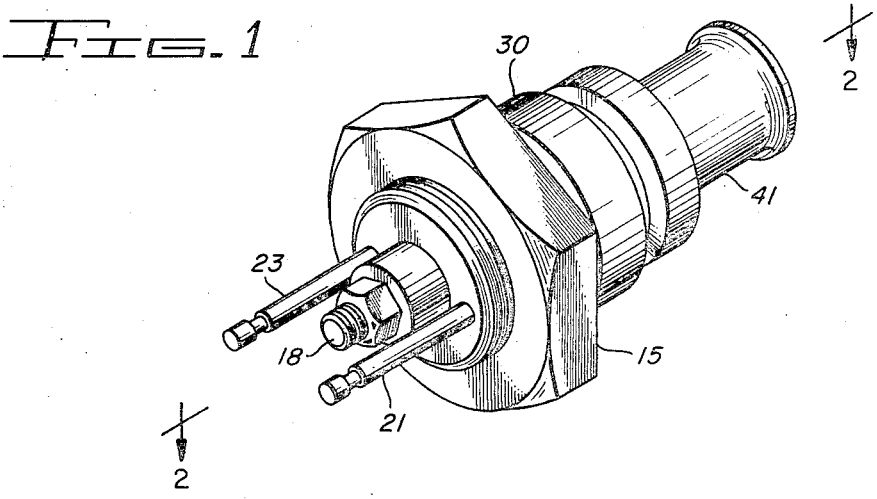
FIG. 1 is a perspective view of a binding post constructed in accordance with the teachings of the present invention.
Figure 2:
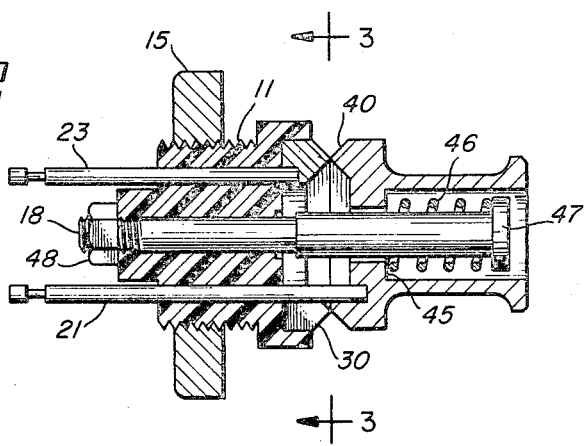
FIG. 2 is a cross-sectional view of FIG. 1 taken along line 2—2.
Figure 3:
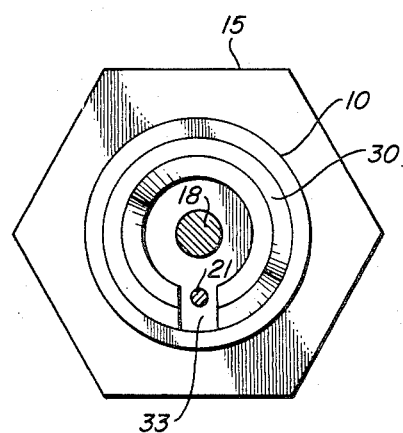
FIG. 3 is a cross-sectional view of FIG. 2 taken along line 3—3.

Referring now to the drawings, a rigid body member 10 constructed of insulating material is provided with external threads 11 to permit attachment of the body to any convenient surface. A shoulder 12 may be placed in abutting contact with an opening in a mounting surface and a nut 15 threaded on the body member 10 to hold the binding post in position. The nut 15 may be metal and the supporting surface may be metal since the rigid body member 10 is insulating material and therefore insulates the remaining components of the binding post from the nut 15 and any supporting surface. The body member 10 is provided with a central opening 17 to admit passage of a spring-mounting bolt 18. A passageway 20, parallel to the central opening 17, is also provided in the body member 10 to permit slidable passage of a conducting post 21. A second passageway 22 is also provided in the body member 10 to permit passage of a second conducting post 23. It may be noted that the second post 23 is not slidably retained in the passage 22 and remains in fixed position as will be described more fully hereinafter.

A first contact ring 30 is positioned within a recess 31 provided in the body member 10; the contact ring 30 includes an opening 33 aligned with the passageway 20. The opening may take any form and is provided in the embodiment chosen for illustration simply by removing a segment of the contact ring 30. A small mounting hole 34 is provided in the ring to receive the conducting post 23.

A second contact ring 40 is formed integrally with a cylindrical extension 41 that may be grasped to separate the contact rings in a manner to be described. A central opening 43 is provided in the contact ring to admit the spring-mounting bolt 18. A shoulder 45 is provided internally of the ring 40 to permit the abutment of the coil spring 46 thereagainst. The coil spring is thus held in compressed position between the shoulder 45 on the ring 40 and the head 47 on the bolt 18. A nut 48 threadedly engages the bolt 18 to hold the assembly intact. A small hole 49 is provided in the ring 40 to grippingly engage the conducting post 21.

It may thus be seen that electrical contact is established from the conducting post 21, at the exterior of the rigid body member 10, through the passageway 20 to the contact ring 40. Similarly, electrical continuity is maintained from the conducting post 23 to the contact 30. The contact rings 30 and 40 may be separated by grasping the extension 41 on the ring 40 and compressing the coil spring 46. Movement of the contact ring 40 results in axial movement of the conducting post 21 since the latter is slidably mounted in the passageway 20. A lead from the component under test may thus be placed between the contact rings 30 and 40 and will be grasped thereby to provide independent and isolated electrical contact thereto from the conducting posts 21 and 23.

I claim:

1. A binding post comprising: a rigid body member of insulating material having a passageway therein to permit a conducting post to slidably pass therethrough; a first contact ring secured to said rigid body, said ring having an opening therein to permit passage of a conducting post therethrough; a second contact ring movably secured to said rigid body; spring-biasing means mounted on said rigid body member for urging said first and second contact rings into engagement with each other; a first conducting post secured to said first contact ring and to said rigid body and extending from said body for connection to an external conductor; a second conducting post secured to said second contact ring and slidably extending through said opening and said passageway and extending from said body for connection to an external conductor.

2. The combination set forth in claim 1, wherein said opening in said first contact ring is formed by the removal of a segment of the contact ring.

3. The combination set forth in claim 1, wherein said first and second conducting posts are parallel and extend in the same direction from the contact rings to which they are connected.

4. The combination set forth in claim 1, wherein said second contact ring is mounted on said rigid body member by a bolt extending coaxially through both contact rings.

5. The combination set forth in claim 1, wherein said spring-biasing means comprises a coil spring mounted on a bolt extending from said rigid body member coaxially through both contact rings, said coil spring exerting a biasing force by compression between said second contact ring and said bolt.

References Cited
UNITED STATES PATENTS 2,701,871    2/1955    Rauch _____ 339—254

ERNEST R. PURSER, Primary Examiner

R. A. HAFER, Assistant Examiner

U.S. Cl. X.R.

339—255